(12) United States Patent
Harm

(10) Patent No.: US 12,103,223 B2
(45) Date of Patent: Oct. 1, 2024

(54) BIODEGRADABLE PLA FILAMENT COMPOSITION FOR MOLDING POROUS STRUCTURE

(71) Applicant: Ji Yeon Harm, Incheon (KR)

(72) Inventor: Ji Yeon Harm, Incheon (KR)

( * ) Notice: Subject to any disclaimer, the term of this patent is extended or adjusted under 35 U.S.C. 154(b) by 306 days.

(21) Appl. No.: 17/786,739

(22) PCT Filed: Dec. 20, 2019

(86) PCT No.: PCT/KR2019/018164
§ 371 (c)(1),
(2) Date: Jun. 17, 2022

(87) PCT Pub. No.: WO2021/125402
PCT Pub. Date: Jun. 24, 2021

(65) Prior Publication Data
US 2023/0043294 A1     Feb. 9, 2023

(30) Foreign Application Priority Data

Dec. 19, 2019    (KR) ........................ 10-2019-0170838

(51) Int. Cl.
*B29C 64/118*     (2017.01)
*B29K 67/00*      (2006.01)
(Continued)

(52) U.S. Cl.
CPC ............ *B29C 64/118* (2017.08); *B33Y 70/10* (2020.01); *B29K 2067/006* (2013.01);
(Continued)

(58) Field of Classification Search
CPC ... B29C 64/118; B29C 48/05; B29C 48/2886; B29C 65/5035; B29C 66/69; B29C 70/38
See application file for complete search history.

(56) References Cited

U.S. PATENT DOCUMENTS 5,939,192 A     8/1999   Rettenbacher et al.

FOREIGN PATENT DOCUMENTS

| JP | H5-57833 A | 3/1993 |
| JP | H5-278738 A | 10/1993 |

(Continued)

OTHER PUBLICATIONS

International Search Report dated Sep. 16, 2020, in connection with corresponding International Patent Application No. PCT/KR2019/018164, 4 pages, along with English translation.
(Continued)

*Primary Examiner* — Stella K Yi
(74) *Attorney, Agent, or Firm* — Hauptman Ham, LLP

(57) ABSTRACT

The present invention relates to a biodegradable PLA filament composition for molding a porous structure. The biodegradable PLA filament composition for molding a porous structure according to one embodiment of the present invention includes polylactic acid (PLA) in 50% by weight to 60% by weight; polybutylene succinate (PBS) in 20% by weight to 30% by weight; polybutylene adipate terephthalate (PBAT) in 7% by weight to 9% by weight; an additive in 0.1% by weight to 1% by weight; a crystallization nucleating agent in 0.1% by weight to 1% by weight; a natural grapefruit seed powder (Jamongci_genu pectin type) in 0.1% by weight to 2% by weight; an inorganic filler in 1% by weight to 10% by weight; and a crosslinking agent in 0.001% by weight to 10% by weight.

10 Claims, 6 Drawing Sheets

(51) Int. Cl.
  *B29K 105/00* (2006.01)
  *B29K 105/16* (2006.01)
  *B29K 105/24* (2006.01)
  *B33Y 70/10* (2020.01)

(52) U.S. Cl.
  CPC .............. *B29K 2067/046* (2013.01); *B29K 2105/0044* (2013.01); *B29K 2105/16* (2013.01); *B29K 2105/24* (2013.01)

(56) References Cited

FOREIGN PATENT DOCUMENTS

| | | |
|---|---|---|
| JP | H5-320401 A | 12/1993 |
| JP | H6-248040 A | 9/1994 |
| JP | H7-17571 A | 1/1995 |
| JP | H9-500924 A | 1/1997 |
| JP | 2002-355932 A | 12/2002 |
| JP | 2004-137726 A | 5/2004 |
| JP | 2005-23262 A | 1/2005 |
| JP | 2005-119708 A | 5/2005 |
| JP | 2016-537495 A | 12/2016 |
| KR | 10-2012-0134163 A | 12/2012 |
| KR | 10-2018-0044715 A | 5/2018 |
| KR | 10-1889224 B1 | 8/2018 |
| KR | 10-1987086 B1 | 9/2019 |

OTHER PUBLICATIONS

Written Opinion dated Sep. 16, 2020, in connection with corresponding International Patent Application No. PCT/KR2019/018164, 4 pages.

BIODEGRADABLE PLA FILAMENT COMPOSITION FOR MOLDING POROUS STRUCTURE

CROSS-REFERENCE TO RELATED APPLICATION

The present application is a national stage filing under 35 U.S.C § 371 of PCT application number PCT/KR2019/018164 filed on Dec. 20, 2019 which is based upon and claims the benefit of priority to Korean Patent Application No. 10-2019-0170838 filed on Dec. 19, 2019 in the Korean Intellectual Property Office. The aforementioned application is incorporated herein by reference in its entirety.

TECHNICAL FIELD

The present invention relates to a biodegradable PLA filament composition for molding a porous structure. In particular, the present invention relates to a biodegradable PLA filament composition that, after being molded into a three-dimensional porous structure using a 3D printer, readily goes through additional molding even at a low temperature, and provides stable properties with almost no changes in the properties even after the additional molding.

BACKGROUND ART

Numerous biodegradable resins or biodegradable compositions employing biodegradable resins such as polylactic acid or fatty acid polyester or natural materials such as starch as a main component have been proposed so far, and biodegradable processed products using these biodegradable resins or biodegradable compositions have been provided.

For example, a publication of Japanese Patent Laid-Open Publication No. H7-17571 (Patent Document 1) discloses a biodegradable buffer material including starch as a main component, and foam molded by adding vegetable fiber and/or protein. In addition, a publication of Japanese Patent Laid-Open Publication No. 2005-119708 (Patent Document 2) discloses a biodegradable resin composition obtained by blending starch and polyol, monosaccharide or oligosaccharide and protein. A publication of Japanese Patent Laid-Open Publication No. H5-320401 (Patent Document 3) discloses a biodegradable molded article obtained by blending flour, starch, cellulose and the like, and foam calcining the result.

However, when using natural materials such as starch, water resistance is often not sufficient, and strength tends to be also insufficient. For this reason, publications of, for example, Japanese Patent Laid-Open Publication No. H5-278738 (Patent Document 4), Japanese Patent Laid-Open Publication No. H5-57833 (Patent Document 5) and Japanese Patent Laid-Open Publication No. 2002-355932 (Patent Document 6) each disclose a method of coating a resin for water-resistance on a surface of a processed product molded from a biodegradable composition, however, this method requires a new coating, which increases the number of processes.

Meanwhile, as a biodegradable composition with enhanced impact resistance or heat resistance, a publication of, for example, Japanese Patent Laid-Open Publication No. H6-248040 (Patent Document 7) discloses a composition formed with phenols, sugar and starch. This composition applies resin formation by a reaction of phenols and sugar. In addition, a publication of Japanese Patent Laid-Open Publication No. 2004-137726 (Patent Document 8) discloses a composition for a biodegradable gravel product formed with starch and tannin or polyphenol, furthermore, tannin or polyphenol and a divalent metal powder having a chelate mordant effect with protein and mineral pulverized powder. However, this composition is obtained by loading a condensed compound of a metal salt and polyphenol into starch, and, since a divalent metal salt is used, is not preferred in applications such as tableware. In addition, tannin and polyphenols used herein are condensed-type tannin such as tannin of persimmon or tea, or bark tannin, and, although suitable as substitutes for gravel, are not suitable for processed products such as tableware since condensed-type tannin and a divalent metal salt are used and strength becomes too high therefrom. Since a metal salt is used, a possibility of adversely affecting the environment is also considered with these metals remaining after decomposition.

A publication of Japanese Patent Laid-Open Publication No. 2005-23262 (Patent Document 9) discloses a biodegradable composition employing a main material obtained by refining 100% natural materials such as grains such as corn, vegetable fibers such as weeds, and sugar cane, and a natural binder such as persimmon or konjac powder. However, specific compositions are not clear, and a possibility of manufacturing into a product practically is not clear. In addition, this composition is formed only with natural materials such as grains, and is not suitable as an industrial product since quality of a finished molded article is not guaranteed.

A publication of Japanese Patent Publication No. H9-500924 (Patent Document 10) discloses a biodegradable composition including starch and protein, cellulose, phenol and tannin, and tall oil or wax. However, this composition includes tall oil or wax, and exudation of wax or the like is worrisome. Therefore, even though it is suitable for manufacturing wood products and the like, there is a possibility that undesirable problems may be caused in terms of safety when it is used in processed products such as tableware.

DISCLOSURE

Technical Problem

The present invention is directed to providing a biodegradable PLA filament composition for molding a porous structure in order to prepare a PLA biodegradable resin composition with excellent strength, modulus and moldability.

Technical Solution

In order to achieve the above object,
a biodegradable PLA filament composition for molding a porous structure according to one embodiment of the present invention may include polylactic acid (PLA) in 50% by weight to 60% by weight; polybutylene succinate (PBS) in 20% by weight to 30% by weight; polybutylene adipate terephthalate (PBAT) in 7% by weight to 9% by weight; an additive in 0.1% by weight to 1% by weight; a crystallization nucleating agent in 0.1% by weight to 1% by weight; a natural grapefruit seed powder (Jamongci_genu pectin type) in 0.1% by weight to 2% by weight; an inorganic filler in 1% by weight to 10% by weight; and a crosslinking agent in 0.001% by weight to 10% by weight.

In addition, in the biodegradable PLA filament composition for molding a porous structure according to one embodiment of the present invention, the PLA, the PBS and the PBAT may have a weight average molecular weight (Mw) of 50,000 to 150,000.

In addition, in the biodegradable PLA filament composition for molding a porous structure according to one embodiment of the present invention, the PBS may have a weight average molecular weight (Mw) of 70,000 to 250,000.

In addition, in the biodegradable PLA filament composition for molding a porous structure according to one embodiment of the present invention, the PBAT may have a weight average molecular weight (Mw) of 50,000 to 200,000.

In addition, in the biodegradable PLA filament composition for molding a porous structure according to one embodiment of the present invention, the crystallization nucleating agent may be any one of aromatic sulfonate derivatives, boron nitride, sodium benzoate, calcium benzoate, 3,4-dimethylbenzylidenesorbitol and 1,2,3-trideoxy-4,6:5,7-bis-O-[(4-propylphenyl)methylene]-nonitol.

In addition, in the biodegradable PLA filament composition for molding a porous structure according to one embodiment of the present invention, the inorganic filler may be any one of talc, calcium carbonate, titanium dioxide, calcium sulfate, magnesium oxide, calcium stearate, mica, silica, calcium silicate, clay and carbon black.

In addition, in the biodegradable PLA filament composition for molding a porous structure according to one embodiment of the present invention, the crosslinking agent may be any one of dicumyl peroxide (DCP), benzoyl peroxide (BPO) and perbutyl peroxide (PBP).

In addition, in the biodegradable PLA filament composition for molding a porous structure according to one embodiment of the present invention, the additive may be any one of a slip agent, a hydrolysis inhibitor, an antioxidant, a UV stabilizer and a plasticizer.

In addition, in the biodegradable PLA filament composition for molding a porous structure according to one embodiment of the present invention, a molded article may be manufactured from the PLA filament composition.

In addition, in the biodegradable PLA filament composition for molding a porous structure according to one embodiment of the present invention, the molded article is manufactured by 3D printing the PLA filament composition.

Such a technical solution will become clearer from the following detailed descriptions of the invention based on accompanying drawings.

Prior to this, terms or words used in the present specification and the claims should not be interpreted as common or dictionary meanings, but should be interpreted as meanings and concepts corresponding to technical ideas of the present invention based on a principle in which the inventor may suitably define the concepts of terms in order to describe the invention in the best possible way.

Advantageous Effects

According to one embodiment of the present invention, a molded article having a three-dimensional porous structure can be manufactured when a biodegradable resin composition of the present invention is prepared into filaments by kneading and extruding using an extruder, and then the extruded filaments go through 3D printing.

In addition, according to one embodiment of the present invention, additional molding is readily conducted at a low temperature of 55° C. to 70° C. after molding to a porous structure through 3D printing, and even when conducting the additional molding, deformation is minimized, which makes it possible to provide properties suitable for use as a cast or a sprint.

In addition, according to one embodiment of the present invention, the molded article, which is manufactured by kneading and extruding the biodegradable resin composition of the present invention using an extruder to prepare filaments and then 3D printing the extruded filaments to have a porous structure, has excellent properties, and the biodegradable molded article having a porous structure is readily mass produced through 3D printing.

BEST MODE

Figure 1A:
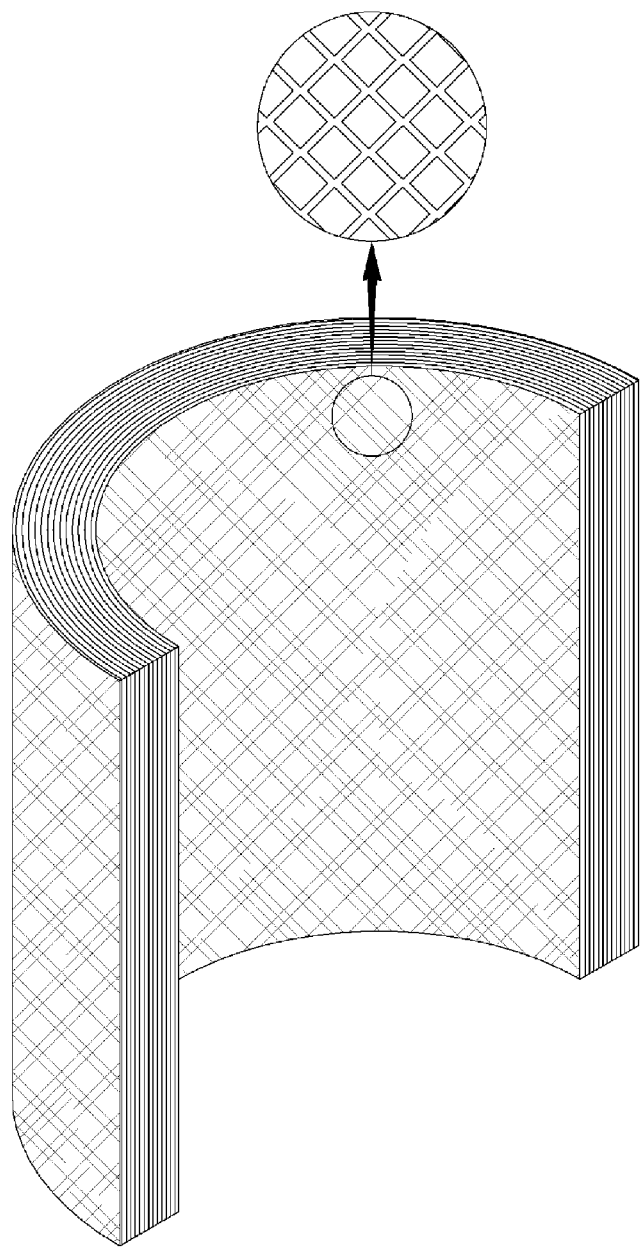
FIG. 1a to FIG. 1c are exemplary views of use showing a molded article of a biodegradable PLA filament composition for molding a porous structure according to one embodiment of the present invention.

A biodegradable PLA filament composition for molding a porous structure according to one embodiment of the present invention may include polylactic acid (PLA) in 50% by weight to 60% by weight; polybutylene succinate (PBS) in 20% by weight to 30% by weight; polybutylene adipate terephthalate (PBAT) in 7% by weight to 9% by weight; an additive in 0.1% by weight to 1% by weight; a crystallization nucleating agent in 0.1% by weight to 1% by weight; a natural grapefruit seed powder (Jamongci_genu pectin type) in 0.1% by weight to 2% by weight; an inorganic filler in 1% by weight to 10% by weight; and a crosslinking agent in 0.001% by weight to 10% by weight.

MODE FOR INVENTION

Hereinafter, one embodiment of the present invention will be described in detail based on accompanying drawings as follows.

One embodiment of the present invention provides a PLA filament composition including PLA, PBS, PBAT, an additive, a crystallization nucleating agent, a natural grapefruit seed powder and an inorganic filler.

(A) PLA (Polylactic Acid)

The polylactic acid used in the present invention has advantages of favorable heat resistance and excellent strength among biodegradable resins and has excellent transparency after molding, and therefore, is used for various purposes from food packaging containers, films, coating agents to medical materials. The polylactic acid used in the present invention may have a weight average molecular weight (Mw) of 50,000 to 150,000.

In addition, since polylactic acid is prepared by polymerization from monomers derived from D-lactide and L-lactide, the content of D-Lactide and L-Lactide may be freely controlled, and the content of each of the components may be adjusted depending on the purposes. In order to achieve the purpose of the present invention, mixing crystalline polylactic acid having a D-lactide content of 1% by weight to 5% by weight and amorphous polylactic acid having a D-lactide content of 9% by weight or greater is preferred.

The composition of the present invention may preferably include the polylactic acid in 50% by weight to 60% by weight. When the content of the polylactic acid is less than 50% by weight in the present invention, moldability is reduced and injection by 3D printing is difficult, and when the content of the polylactic acid is greater than 60% by weight, strength may be reduced.

(B) PBS (Polybutylene Succinate)

The polybutylene succinate used in the present invention is a polyester-based thermoplastic polymer synthesized based on succinic acid, and is an aliphatic polyester compound having excellent biodegradability. PBS has a relatively high melting point and thereby has excellent processability, and has excellent biodegradability as well, and accordingly, has been developed as an alternate resin for polyethylene and polypropylene. Due to the property of superior biodegradability, PBS may be used for applications such as producing environmental-friendly and degradable plastic products, agricultural films, disposable medical supplies, biopolymer materials, packaging materials, disposable tableware, cosmetic bottles, biofibers, bio foam materials and bio nonwoven materials and the like. The polybutylene succinate used in the present invention may have a weight average molecular weight (Mw) of 70,000 to 250,000.

The composition of the present invention preferably includes the polybutylene succinate in 20% by weight to 30% by weight. When the polybutylene succinate is included in less than 20% by weight in the present invention, elasticity may be reduced, and including the polybutylene succinate in greater than 30% by weight may cause a problem of excessive softening.

(C) PBAT (Polybutylene Adipate Terephthalate)

The polybutylene adipate terephthalate used in the present invention is, as a petroleum-based polymer like polybutylene succinate, an aliphatic aromatic copolymerized polyester synthesized by condensation polymerization, and has properties of excellent biodegradability. Polylactic acid has excellent biodegradability or human body compatibility, but has a problem of being readily broken, and by blending polybutylene adipate terephthalate, which is more expensive but has higher flexibility compared to polylactic acid, with polylactic acid, applications such as producing biodegradable plastic products, agricultural films and packaging materials are possible. The polybutylene adipate terephthalate used in the present invention may have a weight average molecular weight (Mw) of 50,000 to 200,000.

The composition of the present invention may preferably include the polybutylene adipate terephthalate in 7% by weight to 9% by weight. When including the polybutylene adipate terephthalate the present invention in less than 7% by weight, sufficient moldability may not be secured and properties may decline, and when including the polybutylene adipate terephthalate in greater than 9% by weight, properties such as modulus may decline.

(D) Crystallization Nucleating Agent

The crystallization nucleating agent in the present invention performs a role of increasing heat resistance by enhancing crystallinity of the polylactic acid and/or polycaprolactone. As the crystallization nucleating agent in the present invention, common substances known in the art may be used, and examples thereof may include one or more types selected from the group consisting of aromatic sulfonate derivatives, boron nitride, sodium benzoate, calcium benzoate, 3,4-dimethylbenzylidenesorbitol and nonitol-based nucleating agents such as 1,2,3-trideoxy-4,6:5,7-bis-O-[(4-propylphenyl)methylene]-nonitol, and specific examples of the nucleating agent representatively include Adeka Mark NA-11 as a phosphate-based, Mitsui Toatsu NC-4, Milliken Millad 3988 as a sorbitol-based, Shell GB (AL-PTBBA) as an aluminum-based, and the like.

The composition of the present invention may include the crystallization nucleating agent in an amount of 0.1% by weight to 1% by weight. When the content of the crystallization nucleating agent is less than 0.1% by weight in the present invention, an increase in the crystallization temperature or an improvement in the crystallization rate may not be expected, causing a problem of making molding impossible in the process of manufacturing a molded article through 3D printing and a problem of weak heat resistance even when molded to some extent. When the content of the crystallization nucleating agent is greater than 1% by weight, an effect of increasing the crystallization rate is insignificant, and an increase in the price of the whole resin is caused, leading to unfavorable economic feasibility.

(E) Inorganic Filler

The inorganic filler in the present invention performs a role of improving molding processability and strength in the process of manufacturing a molded article using the resin composition of the present invention, and nonlimiting examples of the inorganic filler may include one or more types selected from the group consisting of talc, calcium carbonate, titanium dioxide, calcium sulfate, magnesium oxide, calcium stearate, mica, silica, calcium silicate, clay and carbon black.

In addition, the composition of the present invention may include the inorganic filler in 1% by weight to 10% by weight. The content of the inorganic filler being less than 1% by weight has a problem in that it is difficult to improve molding processability, and the content of the inorganic filler being greater than 10% by weight may have a problem of declining mechanical properties of a molded article.

In addition, the inorganic filler preferably has an average particle size of 0.5 µm to 35 µm in the present invention. When the inorganic filler has an average particle size of less than 0.5 µm in the present invention, dispersing the particles may be difficult, and when the inorganic filler has an average particle size of greater than 35 µm, the particles are too large and miscibility may decrease.

(F) Crosslinking Agent

In the present invention, an organic peroxide is preferred as the crosslinking agent, and specific examples of the crosslinking agent may include one or more types selected from the group consisting of dicumyl peroxide (DCP), benzoyl peroxide (BPO) and perbutyl peroxide (PBP), but are not limited thereto.

The composition of the present invention may include the crosslinking agent in an amount of 0.001% by weight to 10% by weight. The content of the crosslinking agent being less than 0.001% by weight in the present invention causes a problem of not initiating the crosslinking reaction, and when the content of the crosslinking agent is greater than 10% by weight, crosslinking is excessively high exhibiting thermosetting, which causes a problem during processing.

(G) Additive

To the composition of the present invention, common additives such as a slip agent, a hydrolysis inhibitor, an antioxidant, a UV stabilizer and a plasticizer may be further added and blended within a range that does not harm the purpose of the present invention.

The composition of the present invention preferably includes the additive in an amount of 0.1% by weight to 1% by weight. When the content of the additive is less than 0.1% by weight, target effects of adding the additive may not be obtained such that oxidation resistance, heat resistance and the like of a molded article become weak, and when the content of the additive is greater than 1% by weight, rigidity and the like may be reduced, and economic feasibility may be worse since the price of the additive is usually high.

(H) Natural Grapefruit Seed Powder (Jamongci_genu Pectin Powder Type)

The natural grapefruit seed powder may be further added depending on the application of a molded article manufactured in the present invention. The natural grapefruit seed powder is a pigment added in a proper amount to produce a target color, and even with 3D printing, the natural grapefruit seed powder may be selected and used in order to produce a desired color, and common pigments other than the natural grapefruit seed powder may be used instead.

The composition of the present invention preferably includes the natural grapefruit seed powder in an amount of 0.1% by weight to 2% by weight, however, the amount of the natural grapefruit seed powder is not particularly limited.

The composition may be prepared including the components described in the present invention through a 3D printing device, and although the composition may be adjusted by introducing cellulose nanoparticles thereto and through a 3D printing device, a problem of declining properties may occur when adding the cellulose nanoparticles, and therefore, it is preferred not to add the above-mentioned cellulose nanoparticles.

In the present invention, the "% by weight" means a mixing ratio between each component.

According to one embodiment of the present invention, a molded article may be manufactured by extruding the PLA filament composition of the present invention through 3D printing.

Herein, the molded article means various products molded, and may be used without limit in, for example, medical casts, automotive interior/exterior materials, multi-purpose storage boxes, products for refrigerated/frozen food storage, transparent sheets, cosmetic containers, products for food storage, dental prostheses and the like, and preferably, may be used in housewares and transparent goods. More specifically, the molded article may be a container for refrigeration, a container for freezing, a multi-purpose storage box, an automotive interior/exterior material, a container for food packaging, a bottle cap, a film for packaging, a protective film, a deco sheet, a retort pouch, a medicine container or an in-and-out hollow molded article, and may be used as a medical cast with particular suitability according to the following experimental examples.

Hereinafter, the present invention will be described in detail with reference to the following examples. However, the following examples are for illustrative purposes only, and the contents of the present invention are not limited by the following examples.

Example 1: Preparation of PLA Filament Composition

Using a twin-screw kneading extruder (Φ: 40 mm, L/D=40), polylactic acid (PLA), polybutylene succinate (PBS), polybutylene adipate terephthalate (PBAT), an additive, a crystallization nucleating agent, a natural grapefruit seed powder, an inorganic filler and a crosslinking agent were uniformly kneaded and extruded in the amounts shown in the following Table 1 to prepare pellets, and the prepared pellets were injected at an injection temperature of 150° C. using an injection machine to prepare a test piece.

TABLE 1

| Component | Weight (%) |
| --- | --- |
| PLA | 55 |
| PBS | 25 |
| PBAT | 8 |
| Additive | 1 |
| Crystallization Nucleating Agent | 1 |
| Natural Grapefruit Seed Powder | 2 |
| Inorganic Filler | 7 |
| Crosslinking Agent | 1 |

Example 2: Preparation of PLA Filament Composition

Using a twin-screw kneading extruder (Φ: 40 mm, L/D=40), polylactic acid (PLA), polybutylene succinate (PBS), polybutylene adipate terephthalate (PBAT), an additive, a crystallization nucleating agent, a natural grapefruit seed powder, an inorganic filler and a crosslinking agent were uniformly kneaded and extruded in the amounts shown in the following Table 2 to prepare filaments, and the prepared filaments were printed using a 3D printer to prepare a test piece.

TABLE 2

| Component | Weight (%) |
| --- | --- |
| PLA | 60 |
| PBS | 18 |
| PBAT | 12 |
| Additive | 2 |
| Crystallization Nucleating Agent | 2 |
| Natural Grapefruit Seed Powder | 2 |
| Inorganic Filler | 5 |
| Crosslinking Agent | 1 |

Experimental Example 1: As a molded article manufactured according to Example 1, the pellets prepared using an extruder were prepared into a test piece using an injection machine at a temperature of 150° C., and properties were measured without additional molding after the injection. The results are shown in the following Table 3.

Experimental Example 2: As a molded article manufactured according to Example 1, the pellets prepared using an extruder were prepared into a test piece using an injection machine at a temperature of 150° C., and then were immersed in warm water heated to about 60° C. for additional molding. Properties were measured after that, and the results are shown in the following Table 3. As shown in the following Table 3, it was seen that, when using the composition of the present invention, moldability was very superior even at a low temperature of about 60° C., additional molding was possible at a low temperature as above even after the first injection, and Izod impact strength (J/m) significantly increased by crystallization through the additional molding, and as a result, properties suitable to be used as a cast or a sprint were obtained.

Experimental Example 3: As a molded article manufactured according to Example 2, the filaments kneaded and extruded using an extruder were prepared into a test piece having a three-dimensional shape using a 3D printer. Properties of the test piece prepared above were measured, and the results are shown in the following Table 4.

Experimental Example 4: As a molded article manufactured according to Example 2, the filaments kneaded and extruded using an extruder were prepared into a test piece having a three-dimensional shape using a 3D printer, and then were immersed in warm water heated to about 55° C. for additional molding. Properties of the test piece were measured after that, and the results are shown in the following Table 4. As shown in the following Table 4, it was seen that, when using the composition of the present invention, moldability was very superior even at a low temperature of about 55° C., additional molding was possible at a low temperature as above even after the first three-dimensional injection by 3D printing, and properties of small deviation were obtained through the additional molding, and as a result, properties suitable to be used as a cast or a sprint were obtained.

Experimental Example 5: As a molded article manufactured according to Example 2, the filaments kneaded and extruded using an extruder were prepared into a test piece having a three-dimensional shape using a 3D printer, and then were immersed in warm water heated to about 70° C. for additional molding. Properties of the test piece were measured after that, and the results are shown in the following Table 4. As shown in the following Table 4, it was seen that, when using the composition of the present invention, moldability was very superior even at a low temperature of about 70° C., additional molding was possible at a low temperature as above even after the first three-dimensional injection by 3D printing, and properties of small deviation were obtained through the additional molding, and as a result, properties suitable to be used as a cast or a sprint were obtained.

1. Measurement of Impact Strength

A test piece for measurement was prepared in accordance with the ASTM D256-10 (2018) (Method A), and an impact strength value thereof was measured using an Izod impact tester (Toyoseiki).

2. Measurement of Tensile Strength

A test piece for measurement was prepared in accordance with the ASTM D638-14, and tensile strength and tensile modulus thereof were measured using a universal testing machine (Zwick Roell Z010). Herein, the test rate was 5 mm/min when measuring the tensile strength, the test rate was 1 mm/min when measuring the modulus, and the test piece was Type 1.

3. Measurement of Flexural Characteristics Depending on Temperature Change and Crystallization Temperature of Test Piece A test piece for measurement was prepared in accordance with the ASTM D790-17, and flexural strength and flexural modulus were measured using a universal testing machine (Zwick Roell Z010). Herein, the test rate was 1.4 mm/min and the distance between supports was 50 mm in the measurements.

TABLE 3

| Entry | Tensile Strength (MPa) | Tensile Modulus (GPa) | Izod Impact Strength (J/m) | Flexural Strength (MPa) | Flexural Modulus (GPa) | Load-Deformation Temperature (° C.) |
|---|---|---|---|---|---|---|
| Experimental Example 1 | 19.3 | 1.90 | 40 | 36.9 | 1.93 | 52 |
| Experimental Example 2 | 25.5 | 1.20 | 371 | 41.3 | 1.27 | 58 |

As seen from Table 3, it was seen that, in the molded article manufactured according to the present invention, Experimental Example 2 crystallizing the molded article had enhanced tensile strength, impact strength and flexural strength compared to Experimental Example 1 that did not go through additional crystallization, and particularly, it was seen that the molded article had very high strength with impact strength being enhanced from 40 to 371. In addition, it was seen that moldability was very superior even at a temperature of about 60° C., and additional molding was possible at a low temperature as above even after the first injection. Accordingly, it was seen that, when the pellets obtained by kneading and extruding the composition according to the present invention using an extruder were injected at an injection temperature of 150° C. using an injection machine and then manufactured into a molded article through 3D printing, excellent moldability was obtained at a low temperature of about 60° C., and strength and modulus were enhanced by increasing crystallinity through additional molding at the low temperature, and particularly, it was seen that impact strength was significantly enhanced.

TABLE 4

| Entry | Tensile Strength (MPa) | Tensile Modulus (GPa) | Izod Impact Strength (J/m) | Deviation | Thickness | Additional Molding Temperature (° C.) |
|---|---|---|---|---|---|---|
| Experimental Example 3 | 68.50 | 0.023 | 40 | 0.56 | 2.00 | — |
| Experimental Example 4 | 69.95 | 0.026 | 40 | 4.44 | 2.00 | 55 |
| Experimental Example 5 | 72.23 | 0.028 | 40 | 2.98 | 2.00 | 70 |

Figure 2:
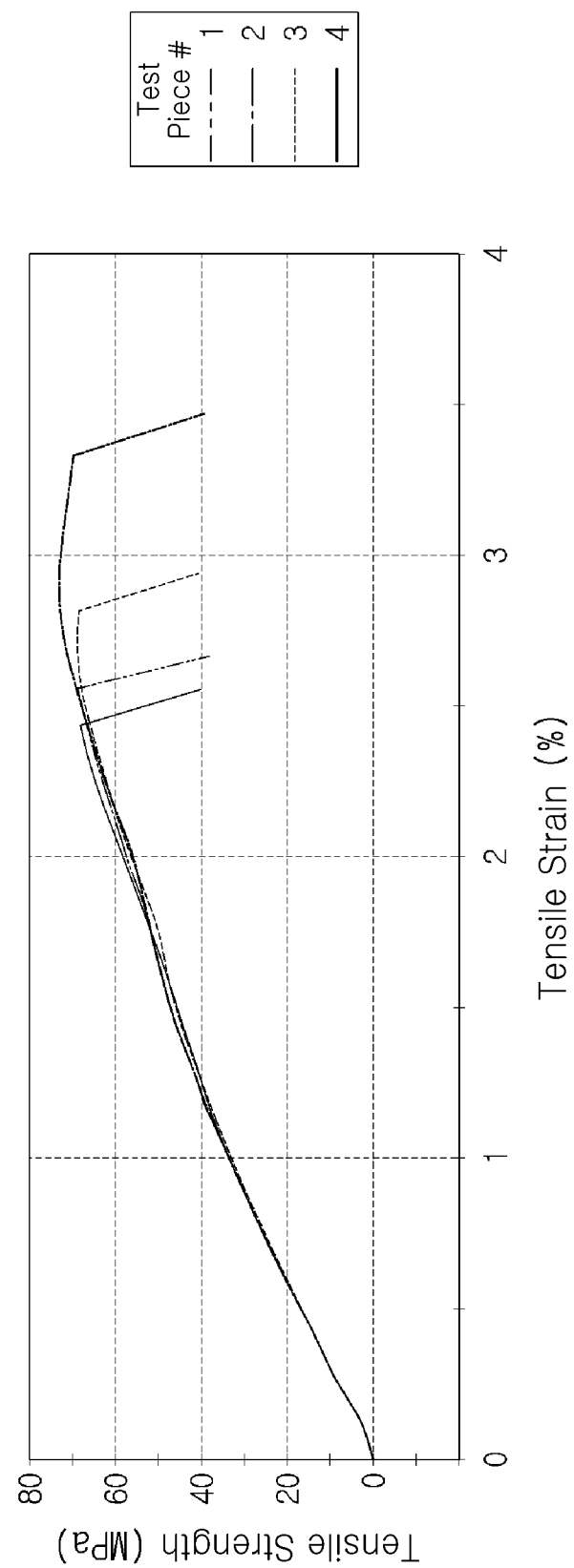
FIG. 2 is a graph obtained from testing properties of multiple test pieces of a biodegradable PLA filament composition for molding a porous structure according to one embodiment of the present invention manufactured under a condition of Experimental Example 3.
Figure 3:
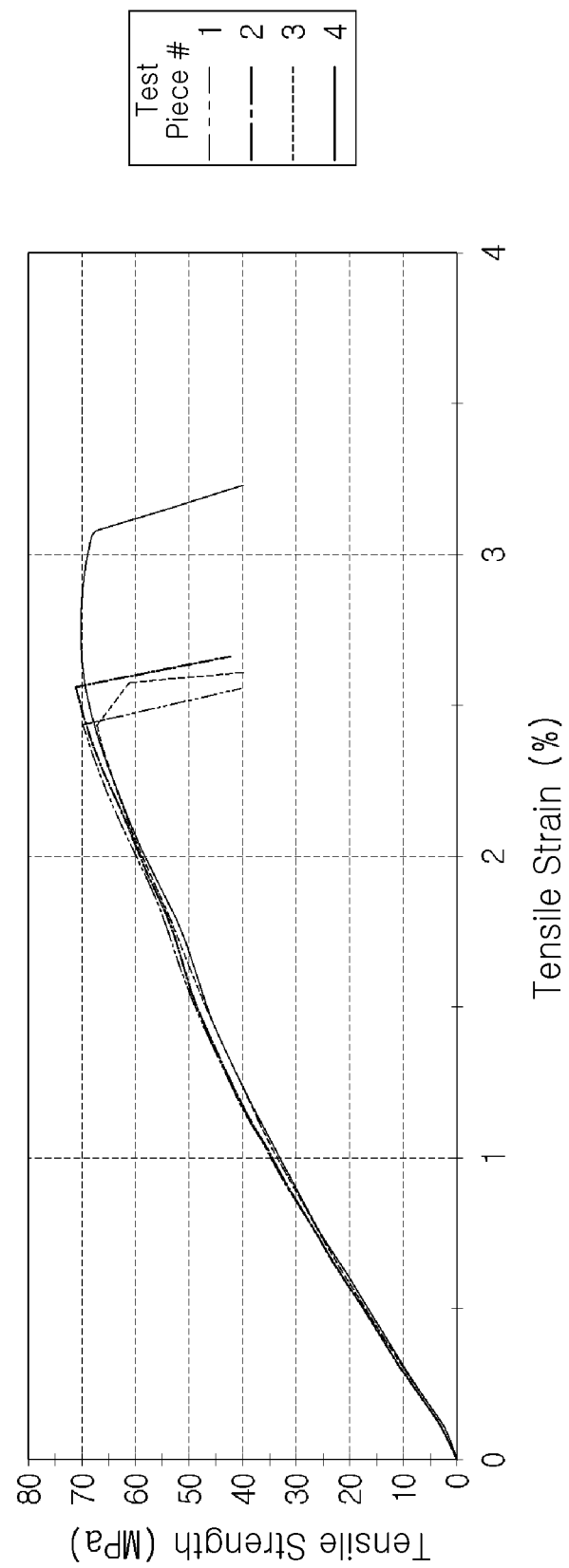
FIG. 3 is a graph obtained from testing properties of multiple test pieces of a biodegradable PLA filament composition for molding a porous structure according to one embodiment of the present invention manufactured under a condition of Experimental Example 4.
Figure 4:
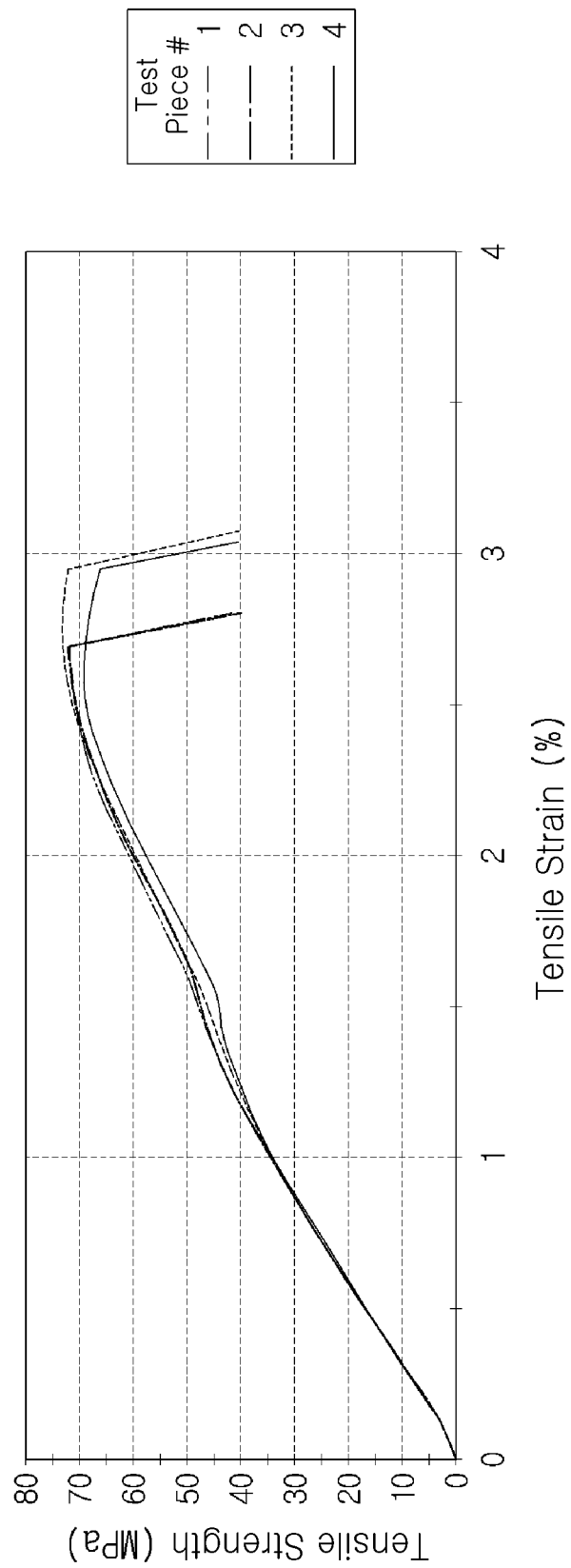
FIG. 4 is a graph obtained from testing properties of multiple test pieces of a biodegradable PLA filament composition for molding a porous structure according to one embodiment of the present invention manufactured under a condition of Experimental Example 5.

As seen from Table 4, the molded article was manufactured through the composition ratio of Example 2, and the table relates to the experimental data of Experimental Example 3 before crystallization and the experimental data of Experimental Examples 4 and 5 after crystallization. In Experimental Examples 3, 4 and 5, it was seen that tensile strength and tensile modulus were slightly different in each of the experimental examples, however, impact strength was the same. In addition, as shown in FIG. 2 to FIG. 4, it was seen that, in Experimental Examples 3, 4 and 5, Experimental Example 3 to Experimental Example 5 had almost the same properties when preparing and testing a number of test pieces under the same condition as each of the examples and experimental examples.

Accordingly, it was seen that the composition according to the present invention was able to be manufactured into a molded article through 3D printing, stable dimensions were maintained when additional molding was applied at a low temperature of 55° C. to 70° C. by maintaining tensile strength, tensile modulus and Izod impact strength to be almost constant, and properties suitable to be used as a cast or a sprint were obtained.

Figure 1B:
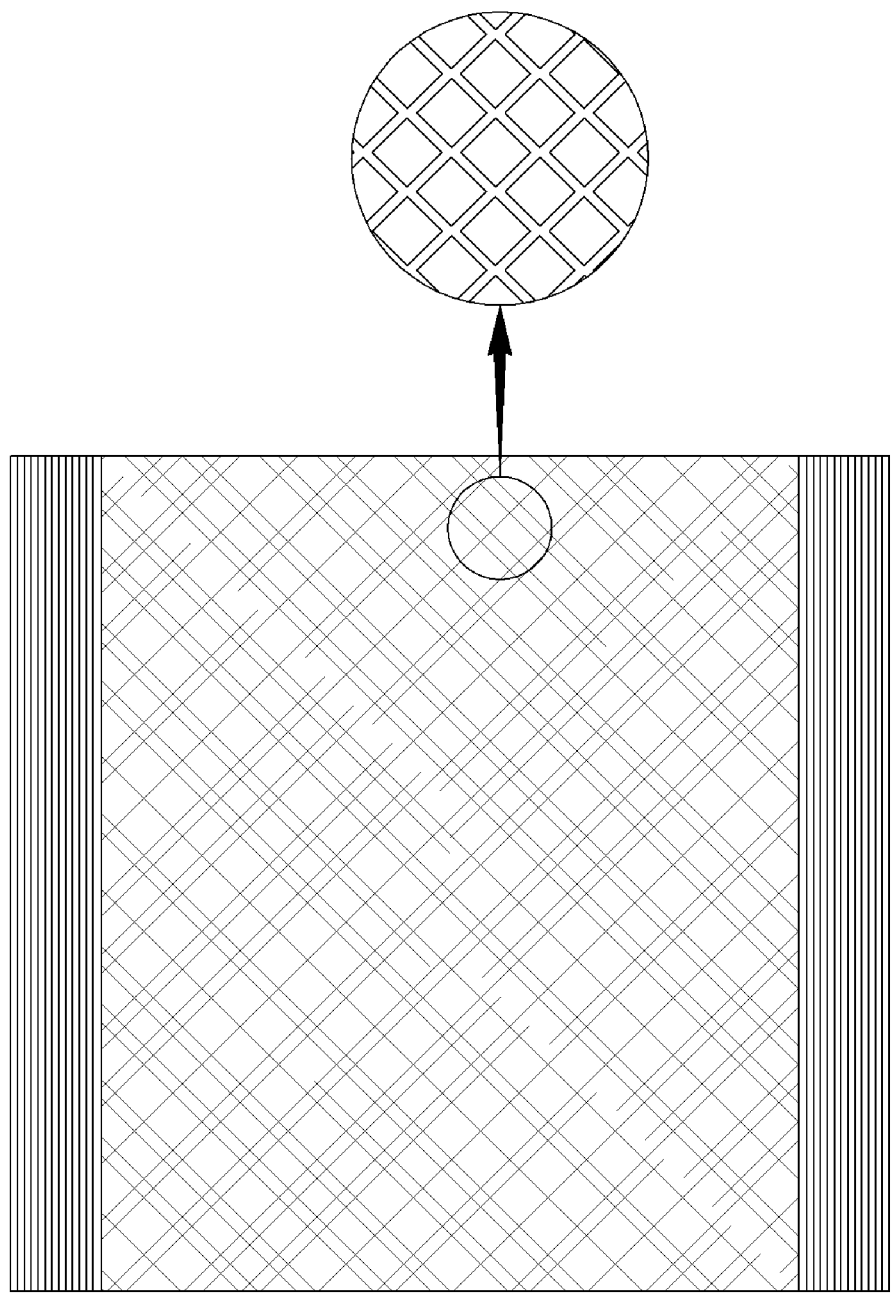
Figure 1C:
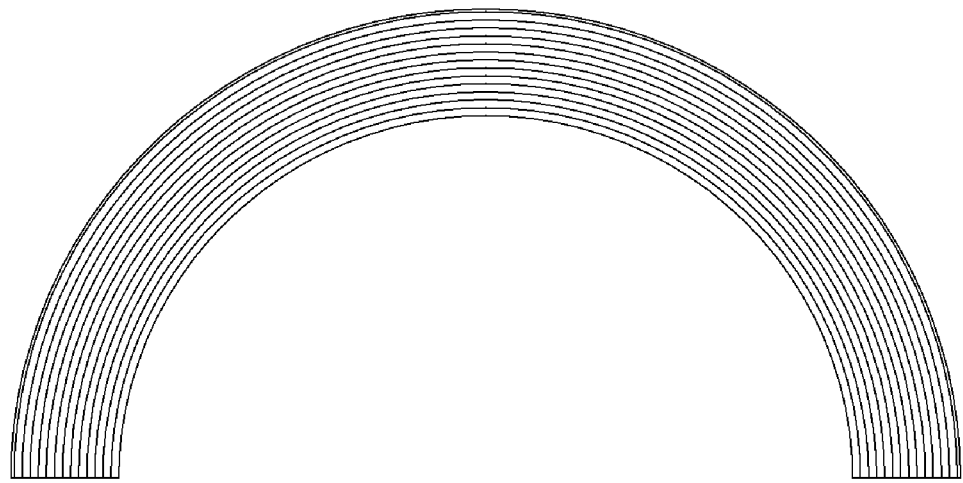

As seen from Table 4, when molding the filaments kneaded and extruded through an extruder using a 3D printer as the molded article manufactured according to the present invention, the molded article may have the surface formed in a porous structure as shown in FIG. 1a to FIG. 1c.

In addition, it was seen that, when additionally molding the molded article gone through 3D printing using the composition prepared according to the present invention at a low temperature of 55° C. to 70° C., properties were almost the same while maintaining the porous structure as it is, which made it possible to provide suitable properties when used as a cast or a sprint.

INDUSTRIAL APPLICABILITY

When the biodegradable resin composition is kneaded and extruded using an extruder to prepare filaments and the extruded filaments are subject to 3D printing, a molded article having a three-dimensional porous structure is manufactured, and the molded article is suitable to be used in casts and sprints.

The invention claimed is:

1. A PLA filament composition comprising:
polylactic acid (PLA) in 50% by weight to 60% by weight;
polybutylene succinate (PBS) in 20% by weight to 30% by weight;
polybutylene adipate terephthalate (PBAT) in 7% by weight to 9% by weight;
an additive in 0.1% by weight to 1% by weight;
a crystallization nucleating agent in 0.1% by weight to 1% by weight;
a natural grapefruit seed powder (Jamongci_genu pectin type) in 0.1% by weight to 2% by weight;
an inorganic filler in 1% by weight to 10% by weight; and
a crosslinking agent in 0.001% by weight to 10% by weight.

2. The PLA filament composition of claim 1, wherein the PLA has a weight average molecular weight (Mw) of 50,000 to 150,000.

3. The PLA filament composition of claim 1, wherein the PBS has a weight average molecular weight (Mw) of 70,000 to 250,000.

4. The PLA filament composition of claim 1, wherein the PBAT has a weight average molecular weight (Mw) of 50,000 to 200,000.

5. The PLA filament composition of claim 1, wherein the crystallization nucleating agent is any one of aromatic sulfonate derivatives, boron nitride, sodium benzoate, calcium benzoate, 3,4-dimethylbenzylidenesorbitol and 1,2,3-trideoxy-4,6:5,7-bis-O-[(4-propylphenyl)methylene]-nonitol.

6. The PLA filament composition of claim 1, wherein the inorganic filler is any one of talc, calcium carbonate, titanium dioxide, calcium sulfate, magnesium oxide, calcium stearate, mica, silica, calcium silicate, clay and carbon black.

7. The PLA filament composition of claim 1, wherein the crosslinking agent is any one of dicumyl peroxide (DCP), benzoyl peroxide (BPO) and perbutyl peroxide (PBP).

8. The PLA filament composition of claim 1, wherein the additive is any one of a slip agent, a hydrolysis inhibitor, an antioxidant, a UV stabilizer and a plasticizer.

9. A molded article manufactured from the PLA filament composition of claim 1.

10. The molded article of claim 9, which is manufactured by 3D printing the PLA filament composition.

* * * * *